March 5, 1968            A. KÄSER            3,371,560
DEVICE FOR ACCURATE GUIDING OF DRILLING TOOLS
IN DRILLING MACHINES
Filed Sept. 23, 1965            2 Sheets-Sheet 1
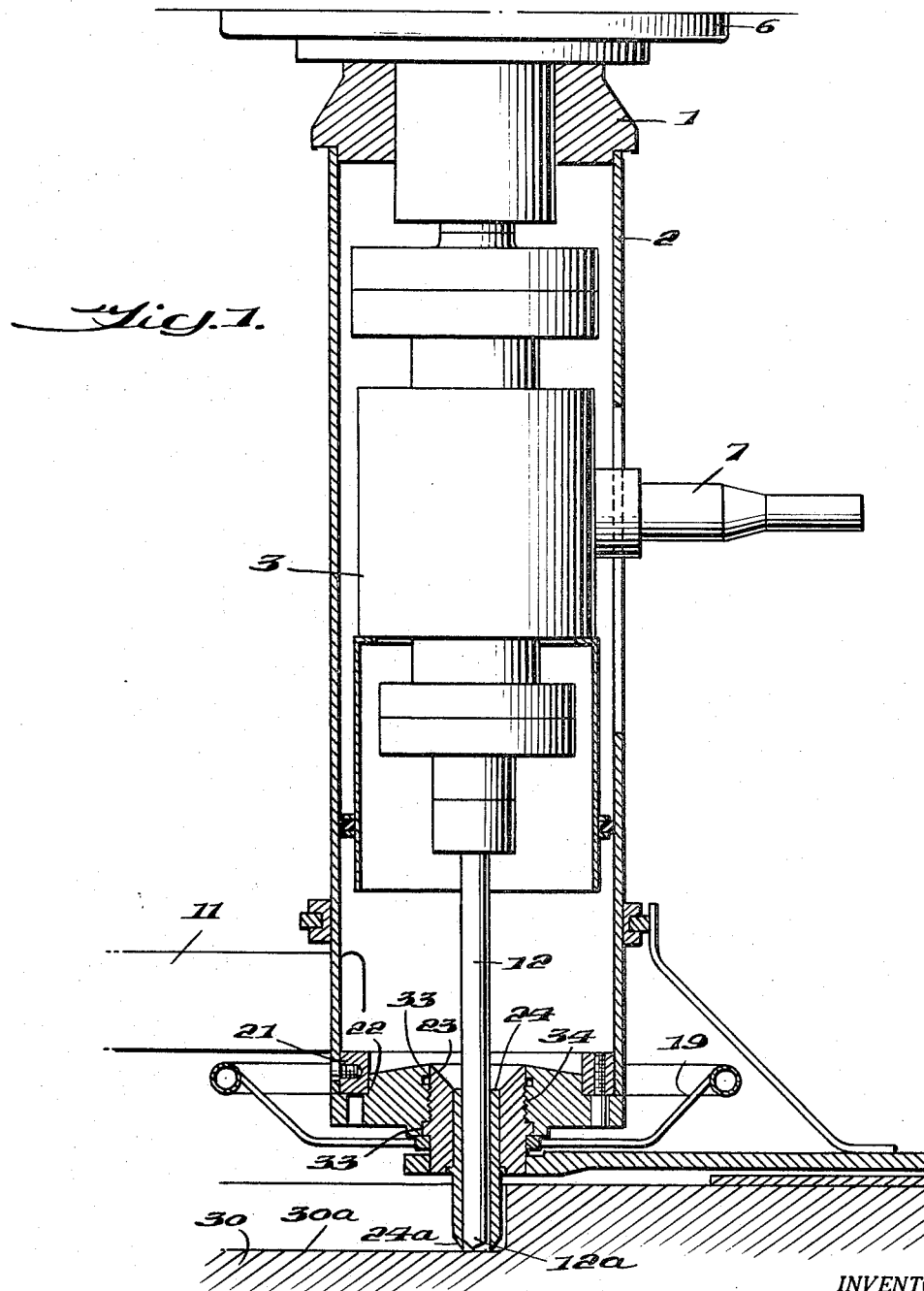
INVENTOR.
Alfred Käser
BY
Pierce, Scheffler & Parker
ATTORNEYS

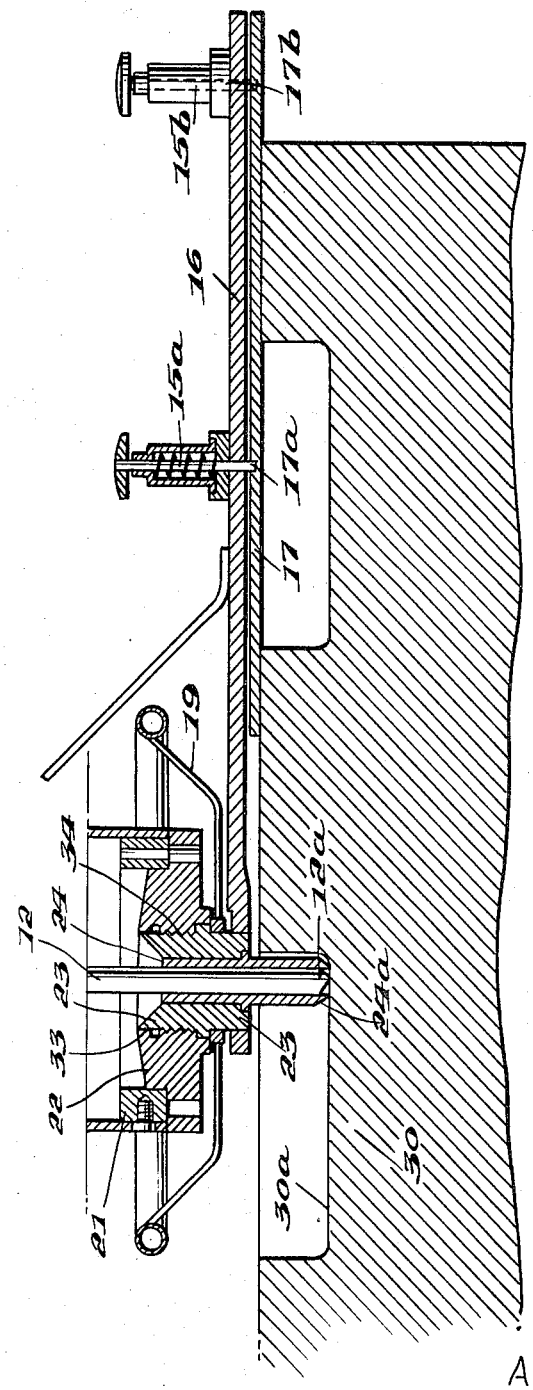

3,371,560
DEVICE FOR ACCURATE GUIDING OF DRILLING TOOLS IN DRILLING MACHINES
Alfred Käser, Rieden, near Baden, Aargau, Switzerland, assignor to Aktiengesellschaft Brown, Boveri & Cie, Baden, Switzerland, a joint-stock company
Filed Sept. 23, 1965, Ser. No. 489,628
Claims priority, application Switzerland, Oct. 23, 1964, 13,780/64
4 Claims. (Cl. 77—62)

ABSTRACT OF THE DISCLOSURE

A device for accurate guiding drilling tools in drilling machines comprises a guide bushing surrounding the drill shaft adjacent the surface of the workpiece to be drilled. The lower end of the guide bushing terminates in an edge and this edge is forced downwardly into a penetrating contact with the surface of the workpiece as a downward force is applied to the bushing.

---

The present invention relates to drilling machines and more particularly to an improved arrangement for obtaining an exact guiding of drills.

Gun drilling with so-called gun drills fitted with hard metal has been developed in recent years to a point where it is possible today to produce on special machines, by this extremely economical chipping method, bores of small depth. Workpieces which until now have been machined by means of more conventional spiral drills, borers and reamers can now be machined with drills of the gun type in one operation.

However, attempts at using drills of the gun type on radial drilling machines have failed up to now, for the following reasons.

Insufficient stability of the drill bushing support and hence destruction of the hard metal cutting edge due to vibration.

Radial drilling machines are positioned according to mark and center point, which is not possible when using gun drills.

It is a principal object of the present invention to anchor the drill bushing support at given positioning in such manner that the vibration is sufficiently damped. Underlying the invention is the concept to anchor the drill bushing for the guiding of the drill on the workpiece.

The invention thus relates to an arrangement on a drilling machine, on which the workpiece is firmly clamped, for the exact guiding of the drill with a drill bushing which guides the drill and which is held concentrically at the drill spindle box by means of a suitable support.

The invention consists in that means are provided for displacing the guiding drill bushing axially, in such manner that under adequate force the lower edged end of the bushing is pressed into i.e. penetrates the surface of the firmly clamped workpiece to be drilled. Thereby an anchoring of the drill bushing on the workpiece in predetermined position is achieved.

The foregoing as well as other objects and advantages inherent in the improved drilling machine in accordance with the invention will become more apparent from the following detailed description of one suitable embodiment thereof wherein:

FIG. 1 is a vertical section of the machine with certain parts shown in elevation; and FIG. 2 is a sectional view of the lower part of the machine showing more details of means by which the drill bushing is positioned in an exact manner on the workpiece.

With reference now to the drawings, a conventional drill spindle box 6 for driving the drill is shown at the upper part of FIG. 1. Depending from the spindle box 6 is a tubular support structure comprising a head 1 to which a cylindrical sleeve 2 is secured. Secured concentrically within the lower part of sleeve 2 by means of a guide plate 22 is a drill bushing 24 for exact guiding of the drill 12 which extends forwardly through sleeve 2 and bushing 24.

The drill bushing 24 is not stationary but rather is arranged for movement axially of itself so that the lower edge thereof may be pressed firmly against the surface 30a of workpiece 30 which is to be drilled by drill 12. For this purpose the drill bushing 24 is secured to and surrounded by an axially displaceable guide bushing 23 which is provided with guide surfaces 33 at the top and bottom which coact with corresponding guide surfaces on plate 22. Between these guide surfaces a shift thread 34 is arranged by means of which guide bushing 23 and hence drill bushing 24 will be raised or lowered as the guide bushing 23 is rotated in one direction or the other. To assist in rotating guide bushing 23, a handwheel 19 is provided thereon. Thus, as the handwheel 19 is rotated in the proper direction, guide bushing 23 and hence drill bushing 24 will be lowered so that the bottom sharpened edge 24a thereof can be pressed firmly into the surface 30a of workpiece 30, thus anchoring the drill bushing on the workpiece in the desired position. Workpiece 30 is secured by suitable means, not illustrated, on the drill plate of the drilling machine.

The improved drill bushing anchoring device thus serves to hold the drilling point of drill 12 exactly and immovably at the desired drilling point. The otherwise much feared shimmying of the drill is thus avoided and there results a precise guiding of the drill. This renders possible gun drilling in an exactly predetermined direction. Yielding of the drill is impossible, even if there should be inhomogeneities in the material being drilled, e.g. welds, in the zone of the drilling point. After the drilling has been completed, the drill bushing 24 can be retracted by rotating the handwheel 19 in the opposite direction.

Due to use of a drill bushing 24 directly on the workpiece, the previously practiced positioning by a center point is no longer possible. In order, however, to obtain an exact positioning, nevertheless, the present invention provides a laterally extending guide arm 16 mounted upon the intermediate guide bushing 23, and the details of this arrangement are illustrated in FIG. 2. Arm 16 is arranged for movement above a template 17 which is provided on the drill table of the machine. For each drilling point, template 17 is provided with two bores 17a and 17b. Mounted on guide arm 16 in spaced relation are two axially movable plugs 15a, 15b which extend through correspondingly dimensioned apertures in the arm without play and thence into the bores 17a, 17b of the template. In this manner, the drill bushing assembly 23, 24 is positioned exactly perpendicular to the axis of the workpiece. To ensure removal of chips, cutting oil is supplied at high pressure to the lower cutting edge tip through the hollow drill pipe 12 and the bore provided in the drilling head 12a by means of an oil supply apparatus 3 with connection to the pressure line nipple 7. Through a V-shaped chip groove cut in the drill head and drill pipe, chips are discharged into a drain 11 by the cutting oil stream. The drill bushing forms a liquidproof seal against the surface of the workpiece, so that drilling oil will not flow off via the workpiece itself. Thereby extremely clean drilling work becomes possible.

I claim:

1. In a drilling machine, the combination comprising a drill spindle box, a drill shaft depending from said box, a drill bushing through which said drill shaft extends to drill the surface of the workpiece, the lower end of said drill bushing terminating in at least one sharpened edge, a stationary support fixed to said machine, means mounting said drill bushing on said stationary support adjacent the surface of the workpiece to be drilled, and means for forcing said drill bushing axially downward relative to said support to establish a firm penetrating contact between the lower edge thereof and the surface of said workpiece thereby to secure said drill shaft against any lateral displacement during the drilling operation.

2. A drilling machine as defined in claim 1 wherein said stationary support is constituted by a tubular support structure depending from said drill spindle box and surrounding said drill shaft, said drill bushing being mounted within said tubular support structure and movable axially thereof.

3. A drilling machine as defined in claim 1 wherein said drill bushing is secured to and surrounded by a guide bushing which includes means cooperative with a guide plate at the lower end of said support structure for displacing said guide bushing and hence also said drill bushing axially into firm contact with the surface of the workpiece being drilled.

4. A drilling machine as defined in claim 3 and which further includes a guide arm extending laterally from said guide bushing, said guide arm including a pair of spaced locating pins extendable through bores in the arm, said guide arm being movable over a template located on the table of the drilling machine and which is provided with pairs of spaced positioning holes adapted to receive said locating pins.

References Cited
UNITED STATES PATENTS 2,830,377   4/1958   Wenz  _____ 77—55 XR
2,977,827   4/1961   Wenz  _____ 77—55

FRANCIS S. HUSAR, *Primary Examiner.*